United States Patent
Herrmann et al.

(10) Patent No.: US 12,491,047 B2
(45) Date of Patent: Dec. 9, 2025

(54) 3D-PRINTED DENTAL RESTORATION PRECURSOR WITH SUPPORT ELEMENT AND PROCESS OF PRODUCTION

(71) Applicant: Solventum Intellectual Properties Company, Maplewood, MN (US)

(72) Inventors: Andreas G. Herrmann, Munich (DE); Malte Korten, Moorenweis (DE); Bastian P. Kirchner, Fürstenfeldbruck (DE); Daniel D. Oberpertinger, Herrsching (DE); Philipp Jurgen Semmler, Ahrensburg (DE); Anja Friedrich, Unterschleißheim (DE); Michaela Urban, Seefeld (DE)

(73) Assignee: Solventum Intellectual Property Company, Maplewood, MN (US)

( * ) Notice: Subject to any disclaimer, the term of this patent is extended or adjusted under 35 U.S.C. 154(b) by 496 days.

(21) Appl. No.: 17/250,966

(22) PCT Filed: Oct. 23, 2019

(86) PCT No.: PCT/IB2019/059084
§ 371 (c)(1),
(2) Date: Apr. 2, 2021

(87) PCT Pub. No.: WO2020/084533
PCT Pub. Date: Apr. 30, 2020

(65) Prior Publication Data
US 2021/0386519 A1    Dec. 16, 2021

(30) Foreign Application Priority Data
Oct. 25, 2018  (EP) .................................. 18202532

(51) Int. Cl.
*A61C 5/77*  (2017.01)
*A61C 5/73*  (2017.01)
*B33Y 80/00*  (2015.01)

(52) U.S. Cl.
CPC .................. *A61C 5/77* (2017.02); *A61C 5/73* (2017.02); *B33Y 80/00* (2014.12)

(58) Field of Classification Search
CPC .... A61C 5/70; A61C 5/73; A61C 5/77; A61C 13/0003; A61C 13/0004; A61C 13/0006;
(Continued)

(56) References Cited

U.S. PATENT DOCUMENTS 4,747,876 A * 5/1988 Hakamatsuka ........ A61K 6/816
106/35
6,328,568 B1 * 12/2001 Sato ...................... A61C 13/20
433/223

(Continued)

FOREIGN PATENT DOCUMENTS

DE   102012108217   12/2013
JP   H08299366 A    11/1996
(Continued)

OTHER PUBLICATIONS

International Search report for PCT International Application No. PCT/IB2019/059084 mailed on Dec. 17, 2019, 4 pages.
(Continued)

*Primary Examiner* — Yogesh P Patel (57) ABSTRACT

The invention relates to a 3d-printed dental restoration precursor, a 3d-printed array comprising a 3d-printed dental restoration precursor, a kit of parts comprising at least two 3d-printed dental restoration precursors or 3d-printed dental restorations and a process of producing such a 3d-printed array, 3d-printed dental restoration precursor or 3d-printed dental restorations. The 3d-printed dental restoration pre-
(Continued)

cursor comprises at least one crown unit having an outer surface and an inner surface and at least one support element having a fixation section. The support element is connected through the fixation section to the outer surface of the crown unit in a particular region.

15 Claims, 3 Drawing Sheets (58) Field of Classification Search
CPC ............ A61C 13/0013; A61C 13/0018; A61C 13/0019; A61C 13/08; A61C 13/082; B33Y 80/00; B29C 64/40
USPC .................................................. 433/218, 223
See application file for complete search history.

(56) References Cited

U.S. PATENT DOCUMENTS

| | | | | |
|---|---|---|---|---|
| 6,626,672 | B1* | 9/2003 | Been ..................... | A61C 5/77 433/223 |
| 6,667,112 | B2* | 12/2003 | Prasad ............... | A61C 13/0003 433/209 |
| 6,882,894 | B2* | 4/2005 | Durbin .................. | A61C 5/77 700/98 |
| 6,915,178 | B2* | 7/2005 | O'Brien ............. | A61C 13/0004 700/118 |
| 7,851,122 | B2* | 12/2010 | Napadensky .......... | B33Y 40/20 522/182 |
| 9,149,989 | B2 | 10/2015 | Uckelmann | |
| 9,155,597 | B2* | 10/2015 | Brodkin ................ | A61K 6/893 |
| 9,183,325 | B2 | 11/2015 | Wighton | |
| 2002/0064745 | A1* | 5/2002 | Schulman ............ | B29C 64/153 264/16 |
| 2002/0064759 | A1* | 5/2002 | Durbin ............... | A61C 13/0004 433/213 |
| 2002/0102519 | A1* | 8/2002 | Baum .................... | A61C 5/77 433/214 |
| 2002/0125592 | A1* | 9/2002 | Schulman .......... | A61C 13/0019 264/16 |
| 2003/0215770 | A1* | 11/2003 | Sekino ..................... | C03C 8/14 264/16 |
| 2004/0031780 | A1* | 2/2004 | Hagemeister ............. | B22F 5/00 219/121.85 |
| 2007/0031775 | A1* | 2/2007 | Andreiko ................ | A61C 7/146 433/24 |
| 2008/0233542 | A1* | 9/2008 | Martinez Procel .... | A61C 13/20 433/223 |
| 2008/0241798 | A1* | 10/2008 | Holzner ................. | B33Y 70/00 433/223 |
| 2009/0176007 | A1 | 7/2009 | Uckelmann | |
| 2010/0285429 | A1 | 11/2010 | Karim | |
| 2011/0170977 | A1* | 7/2011 | Vagt ........................ | B22F 10/28 219/383 |
| 2012/0148985 | A1* | 6/2012 | Jung ...................... | A61C 13/08 433/212.1 |
| 2012/0175799 | A1* | 7/2012 | Karlsson .................. | A61C 5/20 264/16 |
| 2013/0289951 | A1 | 10/2013 | Kuo | |
| 2015/0093719 | A1* | 4/2015 | Beeby ................ | A61C 13/0022 219/76.14 |
| 2015/0238291 | A1* | 8/2015 | Hauptmann ........... | A61C 13/08 264/16 |
| 2016/0089220 | A1* | 3/2016 | Ebert ................. | A61C 13/0019 700/98 |
| 2016/0184189 | A1* | 6/2016 | Hagiwara ........... | B29C 35/0805 522/174 |
| 2017/0035537 | A1* | 2/2017 | Leeson ................ | A61C 13/083 |
| 2017/0042647 | A1* | 2/2017 | Bürke ................. | A61C 13/083 |
| 2017/0065380 | A1 | 3/2017 | Leeson | |
| 2017/0209245 | A1* | 7/2017 | Yang .................... | A61C 19/003 |
| 2019/0117358 | A1* | 4/2019 | Rohner .................... | A61C 5/77 |
| 2020/0179082 | A1* | 6/2020 | Schneider .......... | A61C 13/0004 |
| 2020/0330199 | A1* | 10/2020 | Tubic ................. | A61C 13/0019 |
| 2020/0337813 | A1* | 10/2020 | Kirchner ................ | B33Y 30/00 |
| 2021/0228316 | A1* | 7/2021 | Korten ..................... | A61C 5/77 |

FOREIGN PATENT DOCUMENTS

| | | | | |
|---|---|---|---|---|
| WO | WO 99-61202 | | 1/1900 | |
| WO | WO 2010-110650 | | 9/2010 | |
| WO | WO 2012-068667 | | 5/2012 | |
| WO | WO-2012068667 A1 * | | 5/2012 | ......... A61C 13/0003 |
| WO | 2013016790 A1 | | 2/2013 | |
| WO | WO 2017-155692 | | 9/2017 | |
| WO | 2018154252 A1 | | 8/2018 | |
| WO | WO 2018-231583 | | 12/2018 | |
| WO | WO 2019-239296 | | 12/2019 | |

OTHER PUBLICATIONS

1507 Extended EP Search Report for E18202532.0, PCT/IB2019/059084, Dec. 20, 2018, 2 pages.

* cited by examiner

3D-PRINTED DENTAL RESTORATION PRECURSOR WITH SUPPORT ELEMENT AND PROCESS OF PRODUCTION

CROSS REFERENCE TO RELATED APPLICATIONS

This application is a national stage filing under 35 U.S.C. 371 of PCT/IB2019/059084, filed Oct. 23, 2019, which claims the benefit of European Application No. filed Oct. 23, 2019, the disclosure of which is incorporated by reference in its/their entirety herein.

FIELD OF INVENTION

The invention relates to a 3d-printed dental restoration precursor, a 3d-printed array comprising a 3d-printed dental restoration precursor, a kit of parts comprising at least two 3d-printed dental restoration precursors or 3d-printed dental restorations and a process of producing such a 3d-printed array, 3d-printed dental restoration precursor or 3d-printed dental restorations.

The process of producing the 3d-printed dental restoration precursors can be done on an industrial scale or on a small scale, e.g. producing 3d-printed dental crowns in a so-called chair-side process in the dental office.

BACKGROUND

In a variety of technical fields, physical objects or mechanical workpieces are more and more manufactured by additive manufacturing processes.

Such additive manufacturing processes typically allow for building up an object in its desired individual shape, by subsequently adding material to create that shape. So-called subtractive processes in which an object is machined from an oversized blank by removal of material are more and more replaced by additive manufacturing processes.

While additive manufacturing processes are meanwhile widely used in the industry for rapid prototyping, the manufacturing of final products in many areas is still challenging.

In particular, for making dental restorations it is generally required to use materials that are compatible for use in a human body.

Further, a dental restoration manufactured by a build-up process typically has to fulfil requirements as regards mechanical stability as well as expectations about aesthetics, for example concerning colour and translucency.

Some additive manufacturing processes are based on stereolithography or digital light processing techniques.

Stereolithography generally uses light for hardening radiation curable resins. Data based on computer aided design and/or computer aided manufacturing (CAD/CAM) are used to project a light pattern on a layer of the radiation curable resin. The radiation sensitive resin typically solidifies in consequence of the exposure of the light so that a layer of solidified resin according to the pattern is formed. A three-dimensional object is created by consecutively adding layers. Thereby the pattern is controlled according to the desired outer shape of the three-dimensional object.

The layer-wise manufacturing methods typically require each layer to be supported on a build platform on which the physical object is built up. For any new layer naturally a previously build layer can provide support. However, in case any new layer extends with one or more portions beyond any previously build layer such portions cannot be supported by previously built layers. Accordingly, such portions overhang previously built layers.

It is common to support overhanging portions by support structures that are removed after the object has been built up. Typically, the support structures are rod-shaped and built up in the process of building up the object. An overhanging portion of a layer thus is created directly onto the support structure. This means that the previously build layer of an overhanging portion is a layer of the support structure.

Support structures on the one hand need to be robust and stable enough for printing and post-processing (e.g. cleaning) but need to be removed after final object is completed.

In common support strategies used in 3d-printing, a certain number of supports are needed, to support sufficiently a 3-dimensional object, e.g. crown.

U.S. Pat. No. 9,183,325 B2 (Wighton et al.) describes a method of generating a support structure for an object, the support structure and the object to be fabricated via an additive fabrication technique.

WO 2017/155692 A1 (3M) relates to a preformed dental composite crown being characterized by its shape and chemical composition. It is described that these preformed dental composite crowns can be produced by different technologies, e.g. using an additive manufacturing process, a moulding or milling process.

DE 10 2012 108 217 A1 (DeguDent) describes a process of producing a medical molding based on digitalized data in free-form technology, preferably by selective laser melting or sintering, simultaneously producing a fixing structure originating from the molding, fixing the molding by the fixing structure in the processing device and post-processing in a processing in a processing device using the digitized data. For producing dental crown and bridges it is suggested that each molding has at least three bars, wherein two of the bars extend from opposing sides of the molding.

US 2009/176007 (Uckelmann) concerns a process for the layerwise production of a product comprising the steps of applying a layer of a hardenable material, selectively hardening predetermined regions of the applied layer on the basis of the geometrical data of the product. During the production procedure at least one process parameter is altered in order to influence the grain size in a first region of the product in relation to a second region of the product. In this respect a dental product is described which is connected to a base plate by way of a build-up leg and a support. The dental product is thereby spaced from the base plate. The support is laterally fixed to the dental product in order to counteract the forces which occur in the layer application procedure to prevent unwanted distortion of the dental product.

US 2004/0031780 A1 (Hagemeister et al.) describes a method of making metallic or non-metallic products by freeform laser sintering, in which the products are fabricated from powdery material on a substrate plate in vertically additive, layer-by-layer fashion, wherein at least one support is fabricated between the substrate plate and the outer surface of the product. The support is connected via a predetermined breaking area with the outer surface. The product is joined to a substrate plate by a support (or two thereof). The support is oblong in shape and disposed lengthwise in the direction in which the powder layers are added.

SUMMARY OF INVENTION

Although existing approaches for building up objects provide certain advantages, there is still a need for a method that minimizes adverse effects that may result from the use of support elements during building up the objects.

One of these difficulties is related to the design and number of support elements needed to support the 3d-printed article during the printing process, especially, if the 3d-printing is done by stereolithography (SLA) or digital light processing (DLP). The more complex the shape of an article to be printed is, the more support structure elements are typically needed.

Another difficulty is related to the efforts needed during the post-processing of the 3d-printed article, e.g. the need for removal of the support elements.

One object of the invention is to provide a dental restoration which can be easily produced.

Another object of the invention is to provide a dental restoration precursor which is easy to handle during post-processing and use.

Another object of the invention is to provide a process which allows a simplified production of a dental restoration or dental restoration precursor.

One or more of the above objects are addressed by the invention described in the present text.

In one embodiment the present invention features a 3d-printed dental restoration precursor as described in the present text and claims, the 3d-printed dental restoration precursor comprising
  at least one crown unit having an outer surface and an inner surface,
  and at least one support element having a fixation section,
  the shape of the crown unit being described as follows:
  for posterior teeth having an occlusal top surface and depending side surfaces,
  for anterior teeth having an incisal top edge and depending side surfaces,
  the side surfaces being connected to each other and forming a crown cervix with a crown margin surrounding a crown opening,
  the occlusal top surface or incisal top edge defining a plane x,
  the support element
  having the orientation z directed through the fixation section toward the crown unit,
  the support element being connected through the fixation section to the outer surface of the crown unit
  either in the region adjacent to the occlusal top surface or incisal top edge, preferably at an angle being in a range of 20 to 80° formed by the orientation z of the support element and plane x,
  or in the region of the crown margin, preferably at an angle being in a range of 20 to 80° formed by the orientation z of the support element and plane x.

In another embodiment, the invention relates to a 3d-printed array as described in the present text and claims, the 3d-printed array comprising a support region to which at least one 3d-printed dental restoration precursor comprising a crown unit and a support element as described in the present text and claims is connected through the support element.

A further embodiment of the invention is directed to a process of producing a 3d-printed dental restoration precursor by using an additive manufacturing unit comprising a build platform as described in the present text and claims, the process comprising the steps of
  forming a support element with a fixation section and optionally a handle section from a resin material layer by layer,
  forming a crown unit from a resin material layer by layer,
  the crown unit having an outer surface and an inner surface,
  the shape of the crown unit being characterized as follows:
  for posterior teeth having an occlusal top surface and depending side surfaces,
  for anterior teeth having an incisal top edge and depending side surfaces,
  the side surfaces being connected to each other and forming a crown cervix with a crown margin surrounding a crown opening,
    the occlusal top surface or incisal top edge defining a plane x,
    the support element having an orientation z directed through the fixation section toward the outer surface of the crown unit,
  the forming process being conducted such that
    the support element is connected through the fixation section to the outer surface of the crown unit
    either in the region adjacent to the occlusal top surface or incisal top edge, preferably at an angle being in a range of 20 to 80° formed by the orientation z of the support element and plane x,
    or in the region of the crown margin, preferably at an angle being in a range of 20 to 80° formed by the orientation z of the support element and plane x,
  optionally removing the dental restoration precursor from the additive manufacturing unit.

A further embodiment of the invention is directed to a process for producing a 3d-printed dental restoration precursor by using an additive manufacturing unit comprising a build platform as described in the present text and claims, the process comprising the steps of
  producing a 3d-printed array comprising a 3d-printed dental restoration precursor as described in the present text and claims,
  cleaning the 3d-printed array,
  post-curing the 3d-printed array,
  removing the 3d-printed dental restoration precursor from the 3d-printed array.

Yet a further embodiment of the invention is directed to a process of producing a 3d-printed dental restoration by using an additive manufacturing technique as described in the present text and claims, the process comprising the steps of
  producing a 3d-printed dental restoration precursor comprising a support element and a crown unit as described in the present text and claims,
  removing the support element from the crown unit,
  optionally polishing the outer surface of the crown unit at least in that region where the support element was connected to the outer surface of the crown unit.

The invention is also related to a kit of parts comprising at least two 3d-printed dental restorations or 3d-printed dental restoration precursors as described in the present text and claims.

Unless defined differently, for this description the following terms shall have the given meaning:

"Dental article" means an article which is to be used in the dental field, especially for producing a dental restoration.

"Dental restoration" means dental articles which are used for restoring a defect tooth structure. Examples of dental restorations include dental crowns, bridges, inlays, onlays, veneers, facings, and copings. A dental article should not contain components which are detrimental to the patient's health and thus free of hazardous and toxic components being able to migrate out of the dental or orthodontic article.

"Additive manufacturing" or "3d-printing" means processes comprising a layer-wise creation of an object from digital data. The articles can be of almost any shape or geometry and are produced from a 3-dimensional model or other electronic data source. For the purpose of the present specification the term "additive manufacturing" is understood to mean "3d-printing".

Many 3d-printing technologies exist, one of them being vat polymerization which uses a radiation curing step to make 3-dimensional articles.

Examples of vat polymerization techniques include stereolithography (SLA) and digital light processing (DLP).

"Stereolithography" is an example of an additive manufacturing technique where typically two motors are used for aiming a laser beam across the print area thereby solidifying the printing resin. This process breaks down the design, layer by layer, into a series of points.

"Digital light processing" is another example of an additive manufacturing technique and typically comprises the use of a digital projector screen to flash an image of each layer across the building platform of the additive manufacturing unit. The image is typically composed of square pixels, resulting in a layer formed from small rectangular bricks called voxels.

Typically, the layers have a particular thickness in the build axis. The build axis typically extends in a dimension along which the layers are stacked onto each other. In dimensions perpendicular to the build axis each layer typically has a shape that is derived from an overall three-dimensional shape of the object. Typically, the layers are obtained from virtually slicing a three-dimensional computer model of the object into a multiplicity of virtual layers. The virtual layers are then used to build up physical layers that correspond to the virtual layers in thickness and shape.

The wording "light appropriate to cause the radiation curable material to harden" preferably refers to light within the wavelength of 450 nm to 495 nm (blue light) or light within the wavelength of 330 nm and 445 nm, preferably 383 nm (UV-light). The light used for the method described in the present text can be selected in accordance to the radiation curable material used for building up the object.

As used herein, "a", "an", "the", "at least one" and "one or more" are used interchangeably. Also herein, the recitations of numerical ranges by endpoints include all numbers subsumed within that range (e.g., 1 to 5 includes 1, 1.5, 2, 2.75, 3, 3.80, 4, 5, etc.).

Adding an "(s)" to a term means that the term should include the singular and plural form. E.g. the term "additive(s)" means one additive and more additives (e.g. 2, 3, 4, etc.).

Unless otherwise indicated, all numbers expressing quantities of ingredients, measurement of physical properties such as described below and so forth used in the specification and claims are to be understood as being modified in all instances by the term "about".

The terms "comprise" or "contain" and variations thereof do not have a limiting meaning where these terms appear in the description and claims. The term "comprise" shall include also the terms "consist essentially of" and "consist of".

"And/or" means one or both. E.g., the expression component A and/or component B refers to a component A alone, component B alone, or to both component A and component B.

DETAILED DESCRIPTION

It has been found that the 3d-printed dental restoration precursor as described in the present text has a couple of advantageous properties.

It can be produced easily by using an additive manufacturing technique.

As typically only one single support structure element is required, there is no need for designing and printing a complicated number of different support elements.

This can also be beneficial as regards the amount of printing resin material needed during the production process. For printing only one single support element, typically only a small amount of printing resin material is needed. Surprisingly, it was found that the successful printing of a dental restoration (comprising at least one crown unit) with only one single support element is possible, if the support element is located at a specific region of the crown unit.

By "successful printing" is typically meant that the 3d-printed article (i.e. dental restoration precursor) does not show deformations compared to the desired structure of more than 5% with respect to its intended dimensions.

The region where the support element is connected to the crown unit is either adjacent to the occlusal top surface or incisal top edge of the crown unit or in the region of the crown margin of the crown unit.

Further, the support element is arranged at a certain angle with respect to the orientation of the crown unit.

Arranging the support element at an angle in the range of 20 to 80° formed by the orientation z of the support element and the orientation x of the plane defined by the occlusal top surface or incisal top edge of the crown unit was found to be particularly useful, as this arrangement typically facilitates the printing of the dental restoration precursor in a kind of self-supporting orientation.

A further benefit is related to the efforts needed during the post-processing process.

The removal of support elements is usually time consuming, in particular as this step can typically not be automated. Thus, less support structure elements require less post processing time.

In the present invention, according to one embodiment the removal of the support element is not even needed, as the support structure element is designed for simplifying the use and application of the dental restoration later.

According to the present text, the support element is 3d-printed and may finally be processed together with the dental restoration and be removed before placing the dental restoration on a prepared tooth stump by the dentist in a chairside procedure.

The presence of a support element as described in the present text can be advantageous for a variety of reasons.

The efforts for the removal of the support element is reduced, or even eliminated. This can be advantageous, if the dental restorations or dental restoration precursors are produced on an industrial scale.

The support element can also be used as an adapter for a standardized post-processing unit, if desired. Possible post-processing steps include a cleaning step, a post-curing step and/or a polishing step.

The support element can also be used for labeling purposes or for capturing patient or manufacturing related data.

The support element may also simplify the handling of the dental restoration precursor during use, in particular, if the practitioner has to test which of the dental restorations fits best to the prepared tooth stump and situation in the mouth of the patient.

This can be advantageous, as dental restorations are typically small items and often difficult to handle with fingers in the mouth of a patient, in particular, if the dental restoration is designed for pediatric use.

The invention relates to a 3d-printed dental restoration precursor.

The 3d-printed dental restoration precursor comprises a dental crown unit and a support element.

According to one embodiment, the 3d-printed dental restoration precursor comprises one crown unit and at least one single support element connected to the crown unit.

However, it is also possible that the 3d-printed dental restoration precursor comprises more than one crown unit, e.g. 2, 3, 4 or 5 crown units. In such a case, the crown units are typically connected to each other by a bridging element (e.g. pontic) and thus forming a dental bridge precursor.

In this case, each crown unit is connected to the support element in the manner described in the present text.

The crown unit has a convex outer surface and a concave inner surface.

The crown unit can have different shapes.

The crown unit typically has an occlusal end and a margin end. A cavity (crown opening) extends into the crown unit from the margin end. The crown margin surrounds the crown opening. The cavity forms (or is delimited by) an inner surface of the crown unit.

The crown unit further has an outer surface. The outer surface is shaped to resemble the shape of a natural tooth. Typically, the outer surface of the crown unit is that surface that is visible, when the dental crown is placed in a patient's mouth.

Dental crowns to be used for posterior teeth (e.g. molar and premolar teeth) have an occlusal surface and depending buccal, mesial, distal and lingual, respectively palatinal side surfaces.

Dental crowns to be used for anterior teeth (e.g. cuspids and incisors) have a distal top edge and depending buccal, mesial, distal and lingual, respectively palatinal side surfaces.

The occlusal top surface or incisal top edge of the crown unit defines a plane x.

The plane x can also be characterized by its direction, which extends from that part of the occlusal top surface or crown margin to which the support element is connected to the opposite side of occlusal top surface.

Plane x is typically essentially vertical to the depending side surfaces of the crown unit.

From an anatomic point of view, plane x, which represents the occlusal surface of the tooth in a patient's mouth, is essentially parallel to the so-called camper plane. According to medical dictionaries, the camper plane is running from the tip of the anterior nasal spine to the center of the bony external auditory meatus.

The crown unit can also be characterized by having an orientation y which extends vertically from the crown opening to the occlusal surface or incisal top edge of the crown unit. This orientation y is essentially parallel to the palatinal side surfaces of the crown unit and perpendicular to the plane x formed by the occlusal surface or incisal edge.

Alternatively, a tooth and the respective crown can also be described by a generic tooth coordinate system as it is e.g. shown in FIG. 3B of US 2013/0289951 A1 (Kuo et al.). Such a coordination system may be set-up automatically and/or adjusted manually, using conventional techniques for setting up coordinate systems of an object, which are known to the person skilled in the art.

Plane x as described in the present text is essentially parallel to the x/y plane of the generic tooth coordinate system shown in FIG. 3B of US 2013/0289951 A1.

The crown unit may also have undercut regions.

Producing a crown unit, in particular a crown unit with undercut regions is not easy, even if the production is done by using an additive manufacturing technique. These regions typically require additional support elements to be added during the manufacturing process. These additional support elements can be avoided according to the present invention.

The crown unit is typically composed of a cured dental composite material.

The 3d-printed dental restoration precursors or dental restorations are in particular useful for pediatric applications.

The 3d-printed dental restoration precursor also comprises at least one support element per crown unit. "At least one" means that there can be more than one support element connected to the crown unit.

However, if the producing process described in the present text is followed, these additional support elements are typically not needed from a manufacturing point of view. The support element is typically composed of the same resin material the crown unit is made of.

According to a preferred embodiment, there is only one support element per crown unit.

Thus, the 3d-printed dental restoration precursor typically has only one support element per crown unit which functions as support for the dental restoration precursor during the 3d-printing process. If the 3d-printed dental restoration precursor comprises only one crown unit, according to this preferred embodiment, the 3d-printed dental restoration precursor comprises only one support element.

The support element has a fixation section for fixing the support element to the crown unit.

The fixation section of the support element has an orientation z. The orientation of the support element z is given by the orientation of the fixation section toward the outer surface of the crown unit to which the support element is to be fixed.

The support element is connected through the fixation section to the outer surface of the crown unit either in the region adjacent to the occlusal top surface or incisal top edge of the crown unit or in the region of the crown margin.

The support element is typically connected through the fixation section to the outer surface of the crown unit only in the above-mentioned regions, but not in the region of the occlusal surface.

The support element is fixed to the crown unit at a certain angle. The angle is preferably within a certain range. The angle is defined as the angle formed by the orientation z of the support element and plane x, which is defined by the occlusal top surface or incisal top edge of the crown unit.

If the direction of the support element and the occlusal top surface are in the same plane, the angel is 0°. If the direction of the support element and the occlusal top surface are perpendicular to each other, the angel is 90°.

According to the present invention, the angle is preferably in the range of 20 to 80° or 25 to 75° or 30 to 70° or 35 to 65°, wherein a range of 30 to 70° or 35 to 65° is sometimes preferred.

By adjusting the angle as described in the present text, the 3d-printed dental restoration can be printed in a kind of self-supporting orientation with only one supporting element and without the need for additional support structures or elements.

Alternatively, if desired from a geometrical point of view, the angle can also be defined by the orientation z of the support element and the orientation of the palatial side surfaces of the crown unit extending from the crown opening to the occlusal top surface or incisal top edge.

Further, the orientation z of the support element is typically perpendicular to the orientation of the build platform of the additive manufacturing unit used for the 3d-printing process.

The orientations described above were found to be particularly advantageous, if the dental restoration precursor is produced by an additive-manufacturing method.

If the support element and the crown unit are arranged in this manner, the need for having further support structure elements printed during the manufacturing process is reduced or sometimes even eliminated.

Thus, the dental restoration precursor can be 3d-printed and post-processed in an efficient manner.

If an angle outside this range is chosen, the 3d-printing of the crown unit may sometimes cause an undesired distortion of the crown unit during the 3d-printing process, in particular, if only one support element per crown unit is used.

The support element comprises a fixation section.

The fixation section is the part of the support element which is attached to the outer surface of the crown unit.

According to one embodiment, the fixation section is located adjacent to the occlusal top surface of the crown unit, in particular adjacent to the cusps being present on the occlusal top surface of a crown unit having the shape of a molar or pre-molar tooth.

Such a fixation can be beneficial as it may facilitate post-processing steps such as polishing to be performed after the support element has been removed.

A fixation of the support element closely to the crown margin is sometimes less preferred as there is a risk of chipping or breaking of material when the supporting element is removed from the crown unit.

The fixation section may comprise a pre-determined breaking point to facilitate the removal of the support element before the crown unit is used, e.g. fixed to the prepared tooth stump.

The pre-determined breaking point is preferably located adjacent to the outer surface of the crown unit to which the support structure element is connected.

According to one embodiment, the pre-determined breaking point is located in a distance of 0.1 to 0.5 mm with respect to the surface of the crown unit.

Having the pre-determined breaking point located in such a distance may help reducing the risk that the surface of the crown unit is damaged when the support element is removed (e.g. material of the crown unit may be accidently broken off).

The pre-determined breaking point can have the shape of a neck or constriction.

Alternatively, or in combination, the weakening of the structure or the support element can also be accomplished by including voids during the manufacturing process. After breaking the support structure off from the dental crown body, the voids are opened and radiation curable material contained therein may be released. It has been found that the released radiation curable material distributes on the fraction surface and may thus be used to gloss over the fraction surface after hardening.

If desired, the fixation section of the support element can also be characterized by its size and/or volume.

The fixation section of the support element may have a volume (Vf) in the range of 0.1 to 0.5 mm$^3$ or 0.15 to 0.4 mm$^3$.

The fixation section may have the shape of a cylinder with a diameter in the range of 0.5 to 1.5 mm or 0.6 to 1.2 mm.

The length of the fixation section can be in the range of 0.1 to 1 mm or 0.15 to 0.8 mm or 0.2 to 0.5 mm.

The cross-sectional area of the fixation section (Af) at the connecting point to the outer surface of the crown unit can be in a range of 0.3 to 1 mm$^2$ or 0.4 to 0.8 mm$^2$.

The volume of the crown unit (Vc) is typically within a range of 30 to 150 mm$^3$ or 35 to 120 mm$^3$.

The ratio of the volume of the crown unit (Vc) to the volume of the fixation section (Vf) of the support element can be in a range of 100:1 to 700:1 or 150:1 to 600:1 or 200:1 to 550:1. Thus, the volume of the crown unit is by far larger than the volume of the fixation section.

The ratio of the volume of the crown unit (Vc) to the volume of the support element (Vs) can be in a range of 2:1 to 40:1 or 3:1 to 30:1 or 5:1 to 25:1.

The support element and in particular the fixation section should have a size and/or volume which allows the support element to fulfil its function.

By volume of the crown unit or support element or fixation section is meant the volume which is filled or contains the printing resin.

If the size and/or volume of the fixation section of the support element is too small, the support of the crown unit during the printing process might not be adequate.

If the size and/or volume of the fixation section of the support element is too large, the production costs for the crown unit may become too high as the support element needs to be removed before the crown unit is finally inserted in the mouth of a patient and is thus considered waste.

If the fixation section and support element is designed as described in the present text, there is typically no need for an additional pre-determined breaking point. Thus, according to certain embodiments, the fixation section does not comprise a pre-determined breaking point.

According to one embodiment, besides a fixation section the support element may also comprise a handle section.

If present, the handle section is typically designed to simplify the handling of the dental restoration during use. This is particularly advantageous for the handling of small dental restorations such as pediatric crowns.

The handle section may comprise a segment which can be used for labelling purposes. Information which can be captured on this segment include crown size, tooth number, lot number, patient related data, branding, and combinations thereof.

Figure 1:
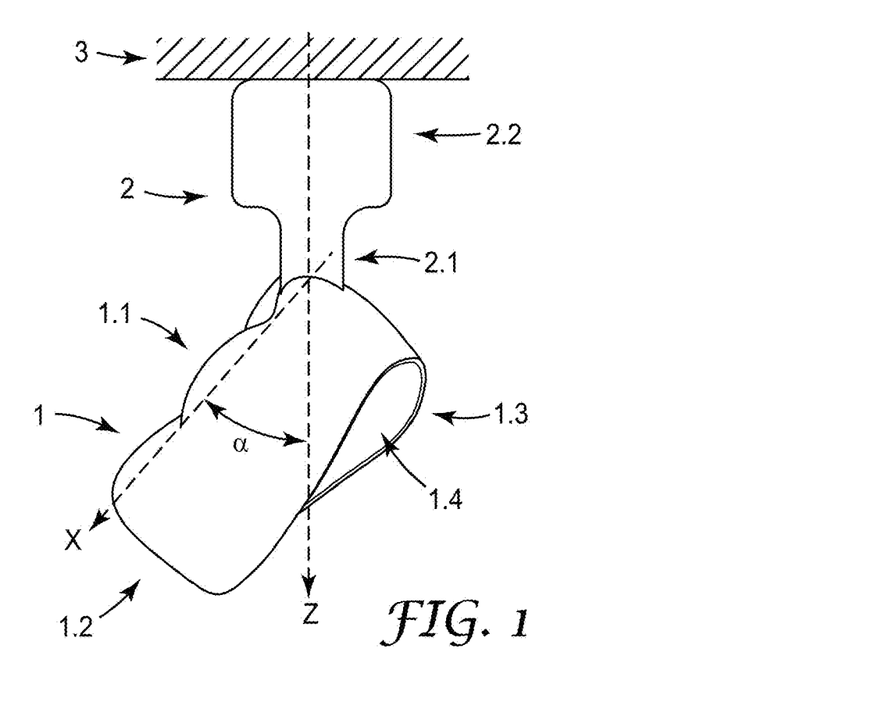
FIG. 1 shows a 3d-printed dental restoration precursor comprising a crown unit and a support element as described in the present text, wherein the support element is connected to the crown unit in the region adjacent to the occlusal top surface of the crown unit.
Figure 2:
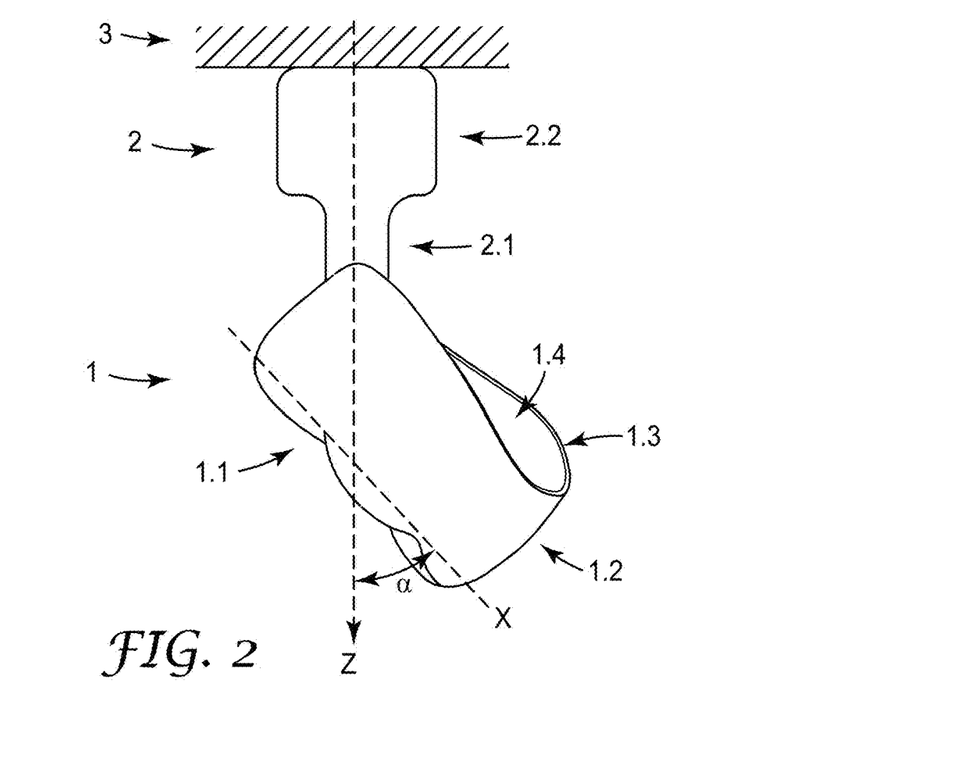
FIG. 2 shows a 3d-printed dental restoration precursor comprising a crown unit and a support element as described in the present text, wherein the support element is connected to the crown unit in the region of the crown margin.

Examples of 3d-printed dental restoration precursors as described in the present text are shown in FIG. 1 and FIG. 2.

The invention also relates to a 3d-printed array.

The 3d-printed array comprises a support region to which at least one crown unit is connected through a support element, preferably through only one support element per crown unit.

The support region, the support element and the crown unit are typically composed of the same resin material.

The 3d-printed array may comprise at least 1 or at least 5 or at least 10 or at least 20 or at least 50 and up to 500 or 400 or 200 crown units.

The number of crown units is typically limited by the size of the build platform of the additive manufacturing unit used for production.

According to one embodiment, the support element of the dental restoration comprises one pre-determined breaking point.

According to another embodiment, the support element of the dental restoration comprises two pre-determined breaking points.

One pre-determined breaking point can be located at the connection of the fixation section of the support element to the outer surface of the crown unit.

One pre-determined breaking point can be located at the connection of the support element to the support region of the 3d-printed array.

If the support element comprises a handle section which is connected to the support region of the 3d-printed array, the pre-determined breaking point is typically located at the connection of the handle section to the support region of the 3d-printed array.

If there are two pre-determined breaking points, the pre-determined breaking points may differ from each other by their breaking resistance.

If it is intended that the 3d-printed dental restoration is initially to be used together with the support element for easier handling, it can be beneficial, if the pre-determined breaking point at the connection to the support region is weaker than the pre-determined breaking point at the connection to the crown unit of the dental restoration precursor. Such a construction typically facilitates the removal of the dental restoration precursor from the 3d-printed array. The risk that the support element is removed by accident is reduced.

If, however, it is intended that the 3d-printed dental restoration is to be used without the support element, it can be beneficial, if the pre-determined breaking point at the connection to the support region is stronger than the pre-determined breaking point at the connection to the crown unit of the dental restoration precursor. Such a construction typically facilitates the removal of the dental restoration from the 3d-printed array without the support element.

The invention is also directed to a process for producing a 3d-printed dental restoration precursor as described in the present text by using an additive manufacturing unit, which comprises a build platform. The build platform has typically a flat surface area.

The 3d-printed dental restoration is typically fixed through the support element to the support region of the 3d-printed array, if present, or to the build platform directly.

The process comprises the steps of
forming a support element with a fixation section from a resin material layer by layer,
forming a crown unit from the resin material layer by layer to obtain a 3d-printed dental restoration precursor,
optionally cleaning the 3d-printed dental restoration precursor,
optionally post-curing the 3d-printed dental restoration precursor,
optionally removing the 3d-printed dental restoration precursor from the additive manufacturing unit,
optionally polishing the outer surface of the crown unit of the 3d-printed dental restoration precursor.

During the 3d-printing process, the build platform is typically moved upwards, so that the distance between the vat containing the resin material and the build platform increases over time.

Preferably, the forming process is conducted such that the dental restoration precursor can be 3d-printed with only one support element, i.e. in a self-supporting orientation.

It can be sufficient, if only one support element is formed per crown unit.

To reduce the amount of resin needed for printing the support element, it can be desirable to choose a 3d-printing strategy which allows for a short distance between the crown unit and the build platform, preferably for the shortest distance which is reasonably possible.

The forming process steps are typically conducted such that the support element is connected through the fixation section to the outer surface of the crown unit in a certain region and at a certain angle.

The angle is formed by the orientation x of the plane defined by the occlusal top surface or incisal top edge of the crown unit and the z orientation of the support element.

During the forming steps the occlusal top surface or the incisal top edge of the crown unit is typically oriented toward the build platform of the additive manufacturing unit, if the support element is connected to the outer surface of the crown unit in the region adjacent to the occlusal top surface or incisal edge.

Thus, according to one embodiment the crown opening of the crown unit is typically oriented generally in opposite to the build platform.

Such an orientation can be advantageous as it may facilitate the dropping of residual resin material from the printed crown unit during the 3d-printing process, in particular if the building direction is diametrical to the x-orientation of the support element.

Alternatively, during the forming process the occlusal top surface or the incisal top edge of the crown unit is oriented opposite toward the build platform of the additive manufacturing unit, if the support element is connected to the outer surface of the crown unit in the region adjacent to the region of the crown margin.

Generally, the support element is typically 3d-printed before the remaining parts of the dental restoration precursor are 3d-printed.

After the support element has been 3d-printed, the 3d-printing process continues with printing the region adjacent to the occlusal top surface or incisal top edge of the final crown unit or with printing the crown cervix.

The production process may comprise further process steps selected from cleaning, post-curing, removing, polishing the dental restoration precursor and combinations thereof, as desired.

Theses process steps are typically conducted outside the additive manufacturing unit, i.e. after the 3d-printed object has been removed from the vat containing the radiation-curable resin material.

The additive manufacturing unit which is used for producing the 3d-printed dental restoration precursors or the 3d-printed array is typically selected from a stereolithographic unit or digital light processing unit.

Generally, the step of building up an object is based on successively performing the steps of:
providing a layer of radiation curable material; and
exposing at least a portion of the layer with light appropriate to cause the radiation curable material to harden.

In this respect, the additive manufacturing unit typically has a light transmissible (preferably transparent) exposure plate for receiving radiation curable material, a build platform on which the object and the support structures are built up, and a light projector for projecting a light pattern through the exposure plate toward the build platform.

The exposure plate and the build platform are preferably movable relative to each other in a positional controlled manner. The position of the exposure plate and the build platform relative to each other, as well as the light pattern are preferably controlled by a computer, based on a computer model of the object. The exposure plate may be part of a vat in which radiation curable material may be provided. Further the vat may be provided in addition to the exposure plate.

During the 3d-printing process, the build platform is moved along a building direction. Either the vat can be moved downwards toward the build platform or the build platform is moved upwards toward the vat.

For producing the 3d-printed dental restoration precursors described in the present text, the later one was found to be more advantageous.

During the 3d-printing process the vat of the additive manufacturing unit is filled with a radiation-curable resin material.

The radiation-curable resin material has typically a viscosity in the range of 1 to 150 Pa*s or 20 to 120 Pa*s at 23° measured with a shear rate of 1 $s^{-1}$.

Such a viscosity was found to be useful, in particular, if only one support element per crown unit is printed during the 3d-printing process.

The resin material used for the 3d-printing process typically comprises (meth)acrylate components and a photo-initiator suitable for initiating the curing reaction of the radiation curable composition.

It can be advantageous, if the radiation-curable resin material comprises radiation-curable (meth)acrylate components comprising at least one urethan moiety.

A suitable radiation-curable resin material may be characterized as comprising
a resin matrix comprising
polymerizable (meth)acrylate(s) not comprising a urethane moiety,
polymerizable urethane(meth)acrylate(s),
wherein the polymerizable (meth)acrylate(s) not comprising an urethane moiety are used in excess over the polymerizable urethane(meth)acrylate(s),
a filler matrix comprising
nanocluster(s),
optionally fumed silica in an amount below 8 wt. %,
the filler matrix being typically present in an amount of 5 to 45 wt. %,
an initiator system comprising
photo-initiator(s),
organic dye(s),
the curable composition typically not comprising softener in an amount of more than 5 wt. %,
wt. % with respect to the weight of the whole composition,
the curable composition having a viscosity of 150 Pa*s or below at 23° C. and a shear rate of 1 $s^{-1}$.

Suitable radiation-curable resin materials are also described e.g. in PCT/US/18/36025 published as WO 2018/231583 A1. The content of this references is herewith incorporated by reference.

The invention is also directed to a process for producing a 3d-printed dental restoration precursor by using an additive manufacturing unit comprising a build platform, wherein the process comprises the steps of
producing a 3d-printed array comprising a dental restoration precursor as described in the present text,
cleaning the 3d-printed array from excess resin,
optionally post-curing the 3d-printed array,
optionally removing the 3d-printed dental restoration precursor from the 3d-printed array.

The printing of a 3d-printed array can be beneficial, if it is intended to produce the dental restoration precursors or dental restorations on an industrial scale.

The 3d-printing of an array comprising many dental restorations typically facilitates the execution of optional post-processing steps, like cleaning, post-curing and polishing.

As described above, according to one embodiment, the support element contained in the 3d-printed array may comprise two pre-determined breaking points, one at the connection to the support region and one at the connection to the dental crown body.

The pre-determined breaking points may differ from each other by their breaking resistance.

According to one embodiment, the pre-determined breaking point at the connection to the support region is weaker than the pre-determined breaking point at the connection to the crown body.

This may facilitate the removal of the 3d-printed dental restoration precursor from the 3d-printed array later and reduces the risk that during the removal step, the support structure element is removed as well.

The process of producing the 3d-printed dental restoration precursor described in the present text can be conducted by either using an array as described in the present text or without an array.

As outlined above, the production by using an array can be beneficial, if the production is done on an industrial scale. In this respect, as a first step the 3d-printed array described in the present text is produced.

As a next step, the 3d-printed array is typically removed from the additive manufacturing unit.

As a further step, the array is typically cleaned from residual resin material, if desired.

As a further step, a post-curing step of the array is conducted, if desired, to improve the stability of the array.

As a further step, the 3d-printed dental restoration precursor or 3d-printed dental restoration is typically removed from the array.

If, however, the production is done only for a small number of items or on a single unit basis (e.g. chairside in the dental office), there may be no need for producing an array with a support region.

In this respect, the process for producing the dental restoration precursor comprises the steps of
forming a support element from a resin material layer by layer, the support element being connected to the build platform of the additive manufacturing unit,
forming a dental restoration comprising a crown unit from the resin material layer by layer, such that the crown unit is connected at its outer surface to a support element during the production process at the region adjacent to the occlusal top surface or incisal top edge of the crown unit preferably at an angle as described in the present text.

The invention is also directed to a process for producing a 3d-printed dental restoration as described in the present text.

This process comprises the steps of producing a 3d-printed dental restoration precursor comprising a support element and a crown unit comprising an outer surface and an inner surface, removing the support element from the crown unit, and optionally polishing the outer surface of the crown unit at least in that region where the support element was connected to the concave outer surface.

Besides these process steps, the process might comprise further process steps like a cleaning step, a colouring step or a disinfecting step.

Further, the shape of the 3d-printed dental restoration precursor may further be adjusted or adapted by grinding or cutting, if desired.

The 3d-printed dental restoration precursors or 3d-printed dental restorations are typically provided to the practitioner as part of a kit from which the practitioner can select the appropriate restoration.

The practitioner grasps the 3d-printed dental restoration precursors at the handle section of the support structure element and tests if the concave inner surface of the crown body fits to the prepared tooth stump.

If it fits, the support structure element is removed, the dental crown body is filled with a dental cement and fixed to the prepared tooth stump.

If it does not fit, a differently sized 3d-printed dental restoration precursor is selected or its shape is adapted accordingly, as desired.

Thus, the invention is also related to a kit of parts comprising at least two 3d-printed dental restoration precursors as described in the present text.

According to one embodiment, the at least two 3d-printed dental restoration precursors typically differ from each other with respect to one property, such as size, shape, colour and combinations thereof.

According to another embodiment, the 3d-printed dental restoration precursors contained in the kit are identical.

A kit can comprise up to 10 or up to 8 differently shaped 3d-printed dental restoration precursors.

A kit can comprise each of the differently shaped 3d-printed dental restoration precursors in an amount up to 10 or 8 different sizes.

Thus, a kit can comprise up to 100 3d-printed dental restoration precursors.

The 3d-printed dental restoration can have the shape of an anterior or posterior or molar tooth.

Typically, the 3d-printed dental restoration precursors are provided in different tooth colours. Tooth colours are typically classified according to the Vita™ colour code.

The kit of parts can also comprise a dental cement suitable for fixing the 3d-printed dental restoration to a prepared tooth surface.

Suitable dental cements are glass ionomer cements (GIZ) and in particular resin modified glass ionomer cements (RM-GIZ). Glass ionomer cements typically contain the following components: acid-reactive filler, polyacid, water, and complexing agent, but no radiation curable components.

The invention is also related to a kit of parts comprising at least two 3d-printed dental restorations as described in the present text.

The 3d-printed dental restorations comprise the crown unit(s), but not the support element(s).

Similar to the kit of parts comprising at least two 3d-printed dental restoration precursors, the at least two 3d-printed dental restorations can be identical or differ from each other with respect to size, shape, colour and combinations thereof.

A kit can comprise up to 10 or up to 8 differently shaped 3d-printed dental restorations.

A kit can comprise each of the differently shaped 3d-printed dental restoration in an amount up to 10 or 8 different sizes.

Thus, a kit can comprise up to 100 3d-printed dental restorations.

FIG. 1 shows a schematic sample of a 3d-printed dental restoration precursor having the shape of a dental composite crown. In this embodiment, the support element is connected to the crown unit in the region adjacent to the occlusal top surface of the crown unit.

FIG. 2 shows a further schematic sample of a 3d-printed dental restoration precursor having the shape of a dental composite crown. In this embodiment, the support element is connected to the crown unit in the region of the crown margin.

Figure 3:
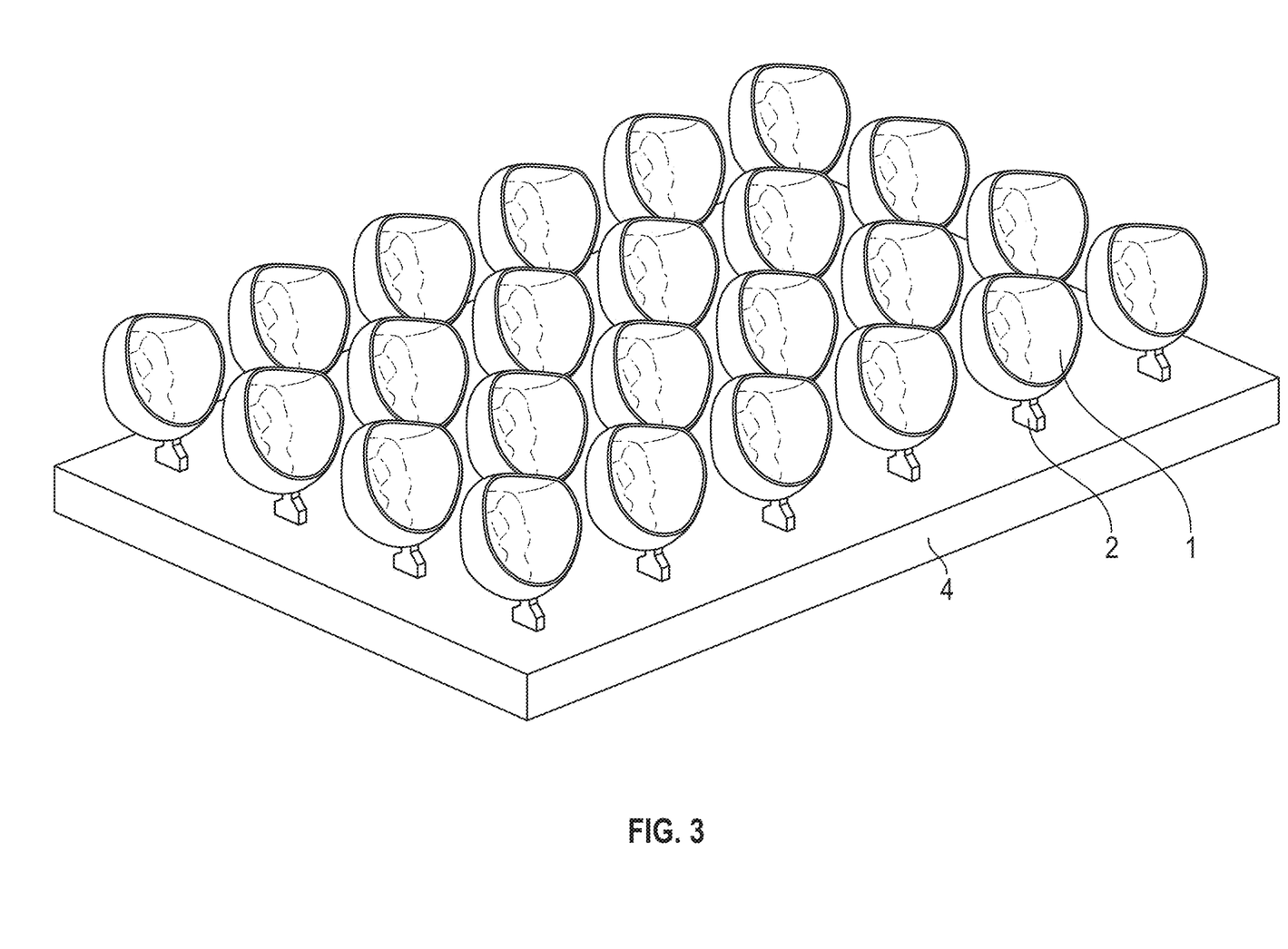
FIG. 3 shows a 3d-printed array comprises a support region to which at least one crown unit is connected through a support element as described in the present text.

FIG. 3 is schematic sample of a 3d-printed array that comprises a support region to which a plurality of crown units are individually connected through associated support elements.

Figure 4:
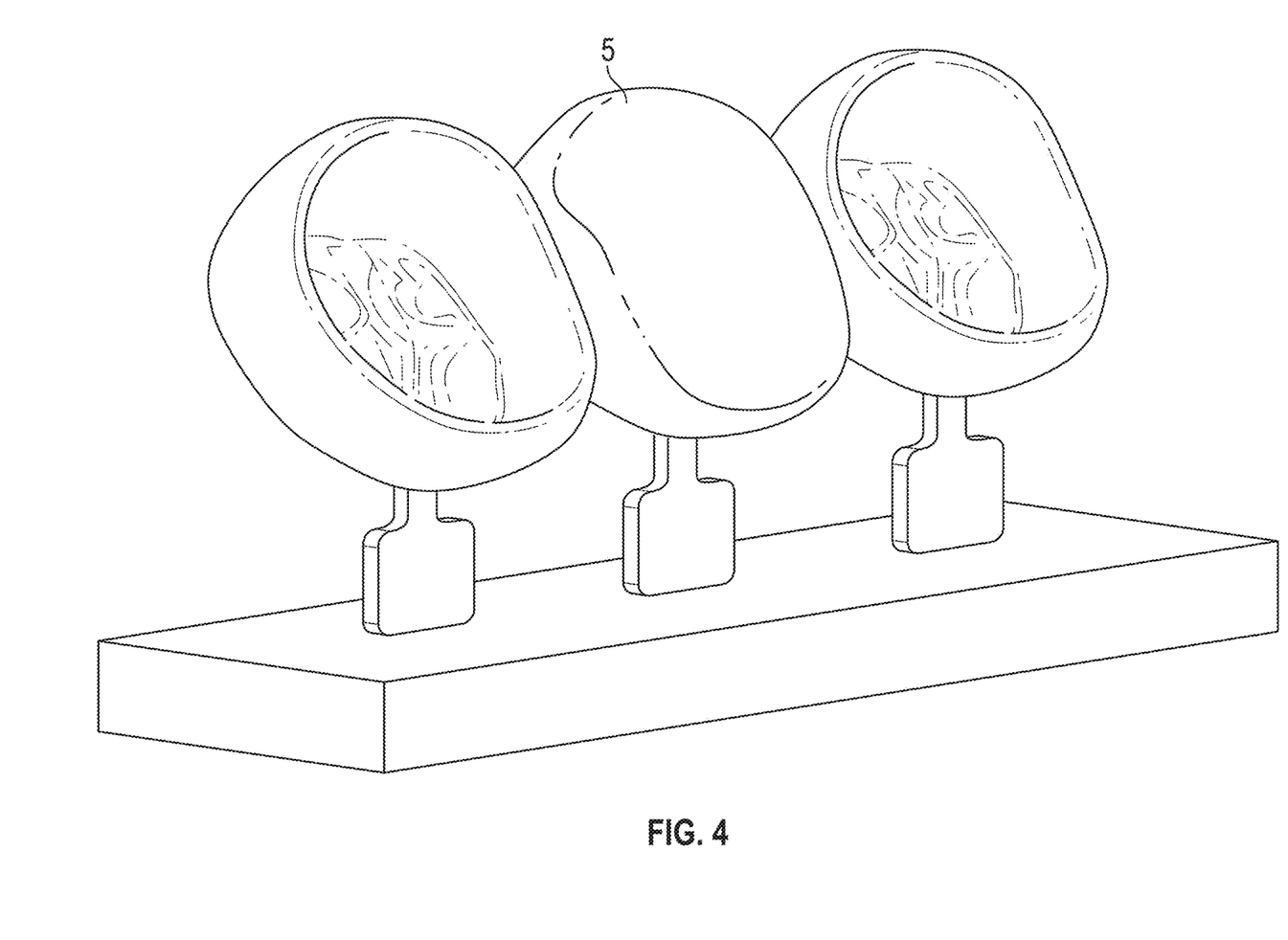
FIG. 4 shows a 3d-printed dental restoration precursor comprising a crown unit, a bridging element, and support elements as described in the present text.

FIG. 4 is another schematic sample of a 3d-printed dental restoration precursor comprising two crown units, a bridging element (i.e., pontic) connecting the crown units, and support elements as described in the present text.

The following elements are shown:
dental crown unit (1)
occlusal top surface (1.1)
crown cervix (1.2)
crown margin (1.3)
crown opening (1.4)
support element (2)
fixation section (2.1)
handle section (2.2)
build platform of an additive manufacturing unit (3)
support region (4)
bridging element (5).

The support element (2) has an orientation z (shown in broken lines). The orientation z extends through the support element (2) with the fixation section (2.1) and the handle section (2.2).

The occlusal top surface of the crown unit (1) defines a plane x (shown in broken lines). The plane x is essentially vertical to the side surfaces forming the crown cervix.

The orientation z and the direction of the plane x form an angle "alpha". The angle alpha is within a range of 20° to 80°.

The 3d-printed dental restoration precursor is fixed to the surface of the build platform (3) of an additive manufacturing unit.

What is claimed is:

1. A 3d-printed dental restoration precursor comprising:
at least one crown unit for a posterior or an anterior tooth, the at least one crown unit having an outer surface and an inner surface, and
a support element extending from a build platform, the support element comprising: a fixation section having a first width, and a first portion having a second width greater than the first width, the support element configured to interface with the at least one crown unit at a connection region on the at least one crown unit, the at least one crown unit having a shape:
- for the posterior tooth, the shape comprising an occlusal top surface and side surfaces extending therefrom, or
- for the anterior tooth, the shape comprising an incisal top edge and side surfaces extending therefrom, wherein the side surfaces of the at least one crown unit are connected to each other and form a crown cervix with a crown margin surrounding a crown opening, the occlusal top surface or the incisal top edge defining a plane x, the plane x being essentially perpendicular to the side surfaces, the support element having an orientation z directed through a longitudinal dimension and geometric center of both the fixation section and the first portion of the support element, the orientation z being essentially perpendicular to the build platform, the support element being connected through the fixation section to the outer surface of the crown only in a region adjacent to the occlusal top surface or incisal top edge, at an angle being in a range of 20 to 80° formed by the orientation z of the support element and plane x, wherein the support element and the at least one crown unit each are formed from a radiation curable resin material.

2. The 3d-printed dental restoration precursor of claim 1, comprising at least two crown units being connected to each other by a bridge.

3. The 3d-printed dental restoration precursor of claim 1, the fixation section of the support element comprising a pre-determined breaking point, the pre-determined breaking point being located adjacent to the outer surface of the at least one crown unit.

4. The 3d-printed dental restoration precursor of claim 1, the at least one crown unit having a volume Vc and the fixation section having a volume Vf, wherein the ratio of Vc to Vf is in a range of 100:1 to 700:1.

5. The 3d-printed dental restoration precursor of claim 1, the at least one crown unit having a volume Vc and the support element having a volume Vs, wherein the ratio of Vc to Vs being in a range of 2:1 to 40:1.

6. The 3d-printed dental restoration precursor of claim 1, the fixation section having a cross-sectional area at a connecting point to the outer surface of the at least one crown unit in the range of 0.3 to 1 mm$^2$.

7. The 3d-printed dental restoration precursor of claim 1, the first portion corresponding to a handle section of the support element, the handle section having a substantially uniform width.

8. The 3d-printed dental restoration precursor of claim 7, the handle section comprising information selected from crown size, tooth number, patient related data, lot number, branding, and combinations thereof.

9. The 3d-printed dental restoration precursor of claim 1, wherein the support element and the at least one crown unit each are formed from a plurality of layers of radiation curable resin material.

10. The 3d-printed dental restoration precursor of claim 1, wherein the radiation curable resin material comprises radiation curable (meth)acrylate components.

11. The 3d-printed dental restoration precursor of claim 10, wherein the radiation curable resin material comprises radiation curable (meth)acrylate components comprising at least one urethane moiety.

12. The 3d-printed dental restoration precursor of claim 11, wherein the radiation curable resin material includes a resin matrix comprising:
- polymerizable (meth)acrylate(s) not comprising a urethane moiety,
- polymerizable urethane(meth)acrylate(s),
  - wherein the polymerizable (meth)acrylate(s) not comprising the urethane moiety are used in excess over the polymerizable urethane (meth)acrylate(s),
- a filler matrix, and
- an initiator system.

13. The 3d-printed dental restoration precursor of claim 12, wherein
- the filler matrix comprises
  - nanocluster(s),
  - fumed silica in an amount below 8 wt. %,
  - the filler matrix being present in an amount of 5 to 45 wt. %,
- the initiator system comprises
  - photo-initiator(s),
  - organic dye(s),
- the curable composition typically not comprising softener in an amount of more than 5 wt. %,
- wt. % with respect to the weight of the whole composition.

14. A 3d-printed array comprising a support region to which a plurality of 3d-printed dental restoration precursors as claimed in claim 1 are connected through the support element of each of the 3d-printed dental restoration precursors.

15. The 3d-printed array of claim 14, the support element of each of the 3d-printed dental restoration precursors comprising at least one pre-determined breaking point comprising a breaking point located at the connection of the support element to the support region of the 3d-printed array.

* * * * *